(12) United States Patent
So et al.

(10) Patent No.: US 11,582,766 B2
(45) Date of Patent: Feb. 14, 2023

(54) WIRELESS COMMUNICATION SYSTEM, COMMUNICATION METHOD, TRANSMITTER AND RECEIVER

(71) Applicant: NIPPON TELEGRAPH AND TELEPHONE CORPORATION, Tokyo (JP)

(72) Inventors: Hideya So, Musashino (JP); Yohei Katayama, Musashino (JP); Kento Yoshizawa, Musashino (JP); Takafumi Fujita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 116 days.

(21) Appl. No.: 17/261,156

(22) PCT Filed: Jun. 28, 2019

(86) PCT No.: PCT/JP2019/025906
§ 371 (c)(1),
(2) Date: Jan. 18, 2021

(87) PCT Pub. No.: WO2020/017278
PCT Pub. Date: Jan. 23, 2020

(65) Prior Publication Data
US 2021/0282154 A1    Sep. 9, 2021

(30) Foreign Application Priority Data

Jul. 19, 2018   (JP) .............................. JP2018-136261

(51) Int. Cl.
*H04W 72/08*   (2009.01)
*H04W 72/04*   (2023.01)
(Continued)

(52) U.S. Cl.
CPC ....... *H04W 72/085* (2013.01); *H04W 72/042* (2013.01); *H04W 72/0446* (2013.01); *H04W 72/0466* (2013.01)

(58) Field of Classification Search
CPC ............. H04W 72/085; H04W 72/042; H04W 72/0446; H04W 72/0466; H04W 12/033;
(Continued)

(56) References Cited

U.S. PATENT DOCUMENTS

2017/0188181 A1* 6/2017 Jin ........................ H04W 76/15
2017/0353365 A1* 12/2017 Li ........................... H04L 43/04

OTHER PUBLICATIONS

Masato Iwai and Hidekazu Sasaoka, Transmission / sharing technology for confidential information utilizing radio wave propagation characteristics, Journal of the Institute of Electronics, Information and Communication Engineers B, vol. J90-B, No. 9, 2007, pp. 770-783.

* cited by examiner

*Primary Examiner* — Dady Chery (57) ABSTRACT

A transmitter includes a first measurement unit configured to measure a radio wave environment between the transmitter and a receiver for an individual wireless resource, a transmission control unit configured to determine the wireless resource and a parameter on a basis of the measurement result of the radio wave environment, an encoder unit configured to perform distributed coding of the bit sequence on a basis of the parameter, and a transmission unit configured to transmit information representing the determined wireless resource and the distributed coded bit sequence, by using the determined wireless resource. The receiver includes a second measurement unit configured to measure the radio wave environment for the individual wireless resource, a reception control unit configured to estimate the parameter on a basis of the measurement result of the radio (Continued)

wave environment, a reception unit configured to receive the information representing the determined wireless resource and the distributed coded bit sequence, by using the determined wireless resource, and a decoder unit configured to decode the received bit sequence on a basis of the parameter.

3 Claims, 6 Drawing Sheets

(51) Int. Cl.
*H04W 72/0446* (2023.01)
*H04W 72/044* (2023.01)

(58) Field of Classification Search
CPC .. H04W 24/00; H04L 1/0001; H04L 25/0204; H04B 17/309
See application file for complete search history.

| MEASUREMENT CHANNEL | MEASUREMENT RESULT (RADIO WAVE UTILIZATION RATE) | QUALITY VALUE |
|---|---|---|
| 1ch | 80% | 1 |
| 2ch | 20% | 7 |
| 3ch | 10% | 9 |
| 4ch | 1% | 10 |
| 5ch | 40% | 3 |
| ... | ... | ... |

WIRELESS COMMUNICATION SYSTEM, COMMUNICATION METHOD, TRANSMITTER AND RECEIVER

CROSS-REFERENCE TO RELATED APPLICATIONS

This application is a 371 U.S. National Phase of International Application No. PCT/JP2019/025906, filed on Jun. 28, 2019, which claims priority to Japanese Application No. 2018-136261 filed on Jul. 19, 2018. The entire disclosures of the above applications are incorporated herein by reference.

TECHNICAL FIELD

The present invention relates to a wireless communication system, a communication method, a transmitter, and a receiver.

BACKGROUND ART

Markets related to Internet of Things (IoT) have been significantly growing. In the IoT, transmitters may access to networks by wireless communication using radio waves. Limiting communication ranges of the transmitters is difficult because the communication ranges are ranges where the radio waves cover. Interceptors, communication terminals of third parties, are capable of receiving radio waves transmitted from the transmitters in the communication ranges of the transmitters. To prevent communication contents of the received radio waves from being intercepted by the interceptors, the transmitters may encrypt the communication contents with secret keys or the like. Transmitters and receivers of wireless communication systems require to share private keys or public keys (hereafter referred to as "encryption keys") used for encryption before communication contents are encoded and decoded.

In Non-Patent Literature 1, a transmitter and a receiver create an encryption key to share on a basis of radio wave propagation characteristics (characteristics of a wireless multipath propagation path). This allows the transmitter and the receiver to share the encryption key before communication contents are encoded and decoded (see Non-Patent Literature 1).

CITATION LIST

Non-Patent Literature

Non-Patent Literature 1: Iwai, Sasaoka, "Secret Information Transmission and Sharing Techniques Based on Radio Wave Propagation Characteristics", IEICE Transactions B, Vol. J90-B, No. 9, pp. 770-783

SUMMARY OF THE INVENTION

Technical Problem

The radio wave propagation characteristics, however, vary due to fading and noise. Thus, transmitters and receivers may be unable to correctly measure the varying radio wave propagation characteristics.

When unable to correctly measure the radio wave propagation characteristics, wireless communication systems are unable to correctly create encryption keys shared by the transmitters and the receivers, thus being unable to perform highly secure communication. In this way, the conventional wireless communication systems may be unable to perform highly secure communication when the radio wave propagation characteristics vary.

In view of the above circumstances, an object of the present invention is to provide a wireless communication system, a communication method, a transmitter, and a receiver, which are capable of performing highly secure communication even when radio wave propagation characteristics vary.

Means for Solving the Problem

One aspect of the present invention is a wireless communication system including a transmitter and a receiver, wherein the transmitter includes: a first measurement unit configured to measure a radio wave environment between the transmitter and the receiver for an individual wireless resource; a transmission control unit configured to determine the wireless resource and a parameter used for transmitting a bit sequence on a basis of the measurement result of the radio wave environment; an encoder unit configured to perform distributed coding of the bit sequence on a basis of the parameter; and a transmission unit configured to transmit information representing the determined wireless resource and the distributed coded bit sequence, by using the determined wireless resource, and the receiver includes: a second measurement unit configured to measure the radio wave environment for the individual wireless resource; a reception control unit configured to estimate the parameter on a basis of the measurement result of the radio wave environment; a reception unit configured to receive the information representing the determined wireless resource and the distributed coded bit sequence, by using the determined wireless resource; and a decoder unit configured to decode the received bit sequence on a basis of the parameter.

One aspect of the present invention is the wireless communication system described above, wherein the first measurement unit is configured to measure a radio wave utilization rate that is a time ratio between a period in which a received power equal to or more than a threshold is detected and a measurement period as the measurement result of the radio wave environment, and the transmission control unit is configured to determine a quality value of wireless communication for the individual wireless resource on a basis of the radio wave utilization rate and determine the parameter on a basis of the quality value for the individual wireless resource.

One aspect of the present invention is a communication method performed by a wireless communication system including a transmitter and a receiver, wherein the method includes: measuring, by the transmitter, a radio wave environment between the transmitter and the receiver for an individual wireless resource; determining, by the transmitter, the wireless resource and a parameter used for transmitting a bit sequence on a basis of the measurement result of the radio wave environment; performing, by the transmitter, distributed coding of the bit sequence on a basis of the parameter; transmitting, by the transmitter, information representing the determined wireless resource and the distributed coded bit sequence, by using the determined wireless resource; measuring, by the receiver, the radio wave environment for the individual wireless resource; estimating, by the receiver, the parameter on a basis of the measurement result of the radio wave environment; receiving, by the receiver, the information representing the determined wireless resource and the distributed coded bit sequence, by using the determined wireless resource; and decoding, by the receiver, the received bit sequence on a basis of the parameter.

One aspect of the present invention is the communication method described above, wherein the method includes: measuring, by the transmitter, a radio wave utilization rate that is a time ratio between a period in which a received power equal to or more than a threshold is detected and a measurement period as the measurement result of the radio wave environment; determining, by the transmitter, a quality value of wireless communication for the individual wireless resource on a basis of the radio wave utilization rate; and determining, by the transmitter, the parameter on a basis of the quality value for the individual wireless resource.

One aspect of the present invention is a transmitter including: a first measurement unit configured to measure a radio wave environment between the transmitter and a receiver for an individual wireless resource; a transmission control unit configured to determine the wireless resource and a parameter used for transmitting a bit sequence on a basis of the measurement result of the radio wave environment; an encoder unit configured to perform distributed coding of the bit sequence on a basis of the parameter; and a transmission unit configured to transmit information representing the determined wireless resource and the distributed coded bit sequence, by using the determined wireless resource.

One aspect of the present invention is the transmitter described above, wherein the first measurement unit is configured to measure a radio wave utilization rate that is a time ratio between a period in which a received power equal to or more than a threshold is detected and a measurement period as the measurement result of the radio wave environment, and the transmission control unit is configured to determine a quality value of wireless communication for the individual wireless resource on a basis of the radio wave utilization rate and determine the parameter on a basis of the quality value for the individual wireless resource.

One aspect of the present invention is a receiver including: a measurement unit configured to measure a radio wave environment between a transmitter and the receiver for an individual wireless resource; a reception control unit configured to estimate a parameter on a basis of the measurement result of the radio wave environment; a reception unit configured to receive information representing the determined wireless resource and a distributed coded bit sequence, by using the determined wireless resource; and a decoder unit configured to decode the received bit sequence on a basis of the parameter.

One aspect of the present invention is the receiver described above, wherein the measurement unit is configured to measure a radio wave utilization rate that is a time ratio between a period in which a received power equal to or more than a threshold is detected and a measurement period as the measurement result of the radio wave environment, and the reception control unit is configured to determine a quality value of wireless communication for the individual wireless resource on a basis of the radio wave utilization rate and estimate the parameter on a basis of the quality value for the individual wireless resource.

Effects of the Invention

According to the present invention, even when radio wave propagation characteristics vary, it is possible to perform highly secure communication.

DESCRIPTION OF EMBODIMENTS

Embodiments of the present invention will be described in detail with reference to the drawings.

First Embodiment

Figure 1:
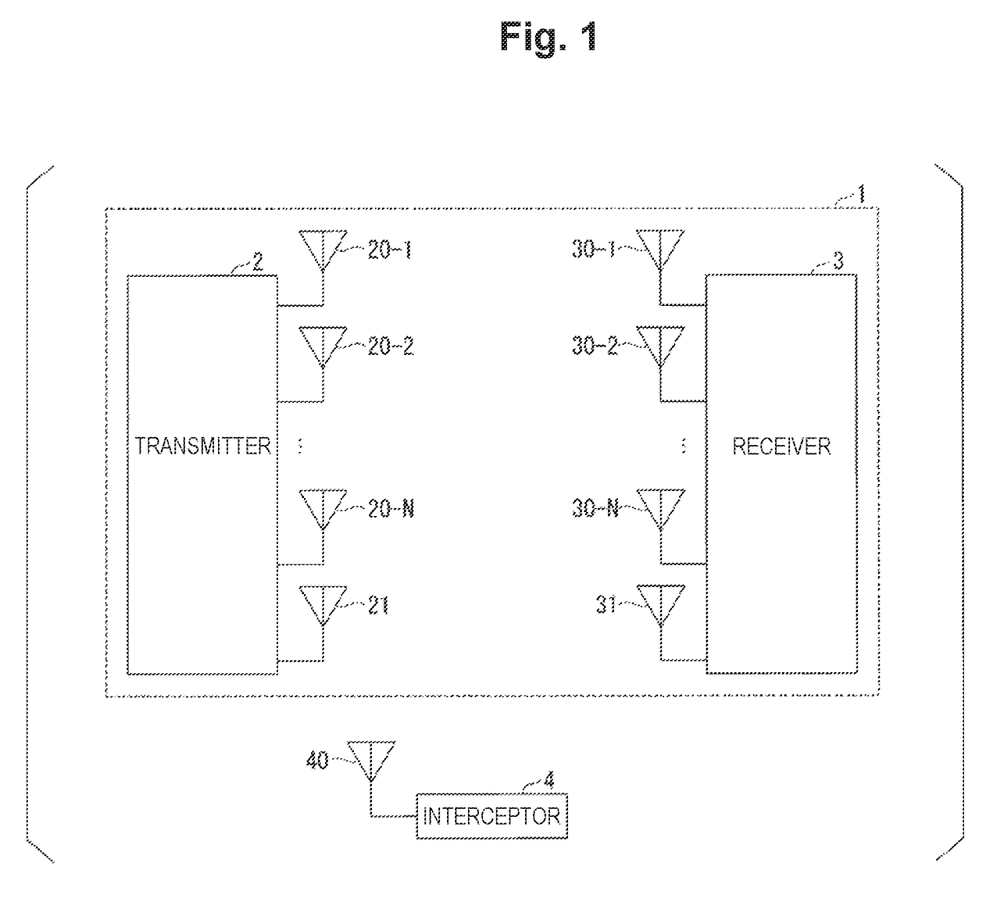
FIG. 1 is a diagram illustrating an example of a configuration of a wireless communication system.

FIG. 1 is a diagram illustrating an example of a configuration of a wireless communication system 1. The wireless communication system 1 is a system that performs wireless communication using radio waves. The wireless communication system 1 includes one or more transmitters 2 and one or more receivers 3. The transmitter 2 and the receiver 3 perform communication using secret sharing processing (secret sharing scheme). Note that the transmitter 2 and the receiver 3 may perform multi radio access technology communication (multi-RAT communication) as a communication using multiple wireless access schemes.

The transmitter 2 includes antennas 20-1 to 20-N (N is an integer of two or more) and an antenna 21. The receiver 3 includes antennas 30-1 to 30-N and an antenna 31. In the following, N is three as an example.

The transmitter 2 is a communication terminal in a transmission side. The transmitter 2 performs distributed coding of an original information (an input bit sequence) by secret sharing processing using an encoding matrix for performing the distributed coding (concealing) of information. Hereafter, a wireless frame including information based on the distributed coded original information is referred to as a "distributed coded frame". In FIG. 1, the transmitter 2 transmits, to the receiver 3, a distributed coded frame including information A based on the original information, a distributed coded frame including information B based on the original information, and a distributed coded frame including information C based on the original information.

The antenna 20-1 transmits the distributed coded frame including the information A to the receiver 3 over a channel f1. The antenna 20-2 transmits the distributed coded frame including the information B to the receiver 3 over a channel f2. The antenna 20-3 transmits the distributed coded frame including the information C to the receiver 3 over a channel f3. The antenna 21 receives radio waves in the channels available to the transmitter 2 and the receiver 3 in radio wave environments between the transmitter 2 and the receiver 3.

The receiver 3 is a communication terminal in a reception side. The receiver 3 decodes the distributed coded original information by decoding processing using a decoding matrix for decoding the distributed coded original information.

In FIG. 1, the transmitter 2 receives, from the transmitter 2, the distributed coded frame including the information A based on the original information, the distributed coded frame including the information B based on the original information, and the distributed coded frame including the information C based on the original information.

The antenna 30-1 receives the distributed coded frame including the information A from the transmitter 2 over the channel f1. The antenna 30-2 receives the distributed coded frame including the information B from the transmitter 2 over the channel f2. The antenna 30-3 receives the distributed coded frame including the information C from the transmitter 2 over the channel f3. The antenna 31 receives the radio waves in the channels available to the transmitter 2 and the receiver 3 in the radio wave environments between the transmitter 2 and the receiver 3.

The interceptor 4 is a communication terminal of a third party. The interceptor 4 includes an antenna 40. The antenna 40 receives the radio waves in the channels available to the transmitter 2 and the receiver 3 in the radio wave environments between the transmitter 2 and the receiver 3. The distributed coded original information is able to be decoded on a basis of two or more pieces of information among the information A, B, and C. When the antenna 40 receives the distributed coded frame including the information A, the interceptor 4 is unable to decode the distributed coded original information on a basis of the information A alone. This allows the transmitter 2 to conceal the original information.

Even when the antenna 40 receives the distributed coded frame including the information A and the distributed coded frame including the information B, the interceptor 4 is unable to decode the original information when the encoding matrix that has been used for the distributed coding in the transmitter 2 is unknown to the interceptor 4. When measuring the radio wave environments between the transmitter 2 and the receiver 3, the transmitter 2 determines an encoding matrix on a basis of information of the measured radio wave environments (e.g., radio wave utilization rates).

The interceptor 4 is unable to measure the radio wave environments between the transmitter 2 and the receiver 3, and thus the encoding matrix that has been used for the distributed coding in the transmitter 2 is unknown to the interceptor 4. This allows the transmitter 2 to conceal the original information.

If the interceptor 4 could measure the radio wave environments between the transmitter 2 and the receiver 3, the encoding matrix that has been used for the distributed coding in the transmitter 2 is known to the interceptor 4. Even in this case, the interceptor 4 is unable to obtain a formula (hereinafter referred to as a "conversion formula") converting the information representing the radio wave environments into the encoding matrix. When unable to obtain the conversion formula, the interceptor 4 is unable to convert the information representing the radio wave environments into the encoding matrix, thus being unable to decode the original information. This allows the transmitter 2 to conceal the original information.

Here, when the wireless communication system 1 includes a plurality of the transmitters 2 and a plurality of the receivers 3, the interceptor 4 has a further difficulty to decode the original information due to more combinations of the transmitters 2 and the receivers 3. In addition, when more channels are possible to use for communication, the interceptor 4 has a further difficulty to decode the original information due to more combinations of the channels.

Figure 2:
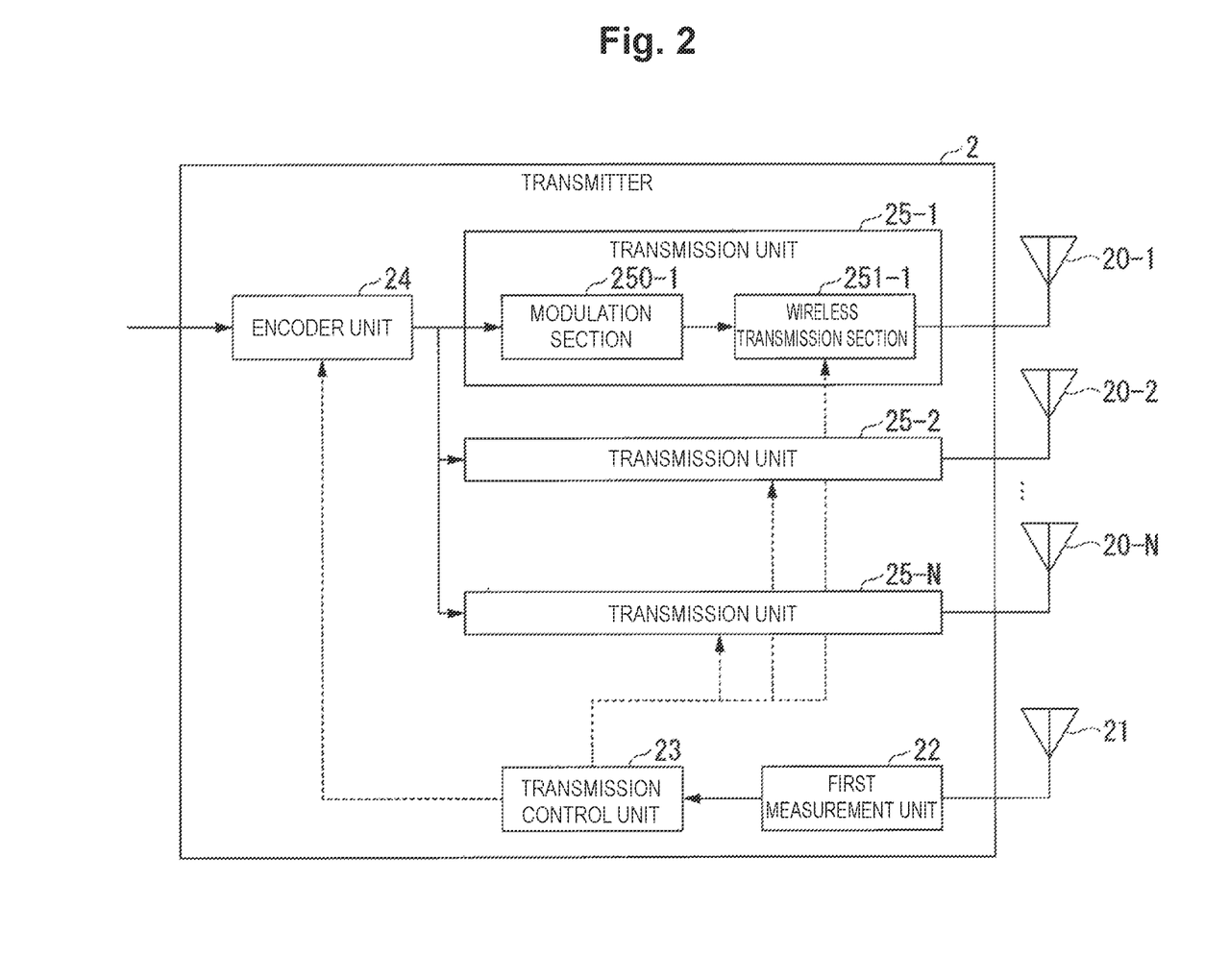
FIG. 2 is a diagram illustrating an example of a configuration of a transmitter.

FIG. 2 is a diagram illustrating an example of a configuration of the transmitter 2. The transmitter 2 includes the antennas 20-1 to 20-N, the antenna 21, a first measurement unit 22, a transmission control unit 23, an encoder unit 24, and transmission units 25-1 to 25-N.

Each of functional units of the first measurement unit 22, the transmission control unit 23, the encoder unit 24, and the transmission units 25 is implemented with hardware such as large scale integration (LSI) and application specific integrated circuit (ASIC). Each of the functional units may be implemented with a processor, such as a central processing unit (CPU), executing a program stored in a storage unit of the transmitter 2.

The storage unit of the transmitter 2 is a non-volatile storage medium (non-transitory storage medium) such as a flash memory and a hard disk drive (HDD). The storage unit of the transmitter 2 may include a volatile storage medium such as a random access memory (RAM) and a register. The storage unit of the transmitter 2 stores a program and a data table.

The first measurement unit 22 measures the radio wave environments between the transmitter 2 and the receiver 3 on a basis of the radio waves received by the antenna 21. That is, the first measurement unit 22 measures the radio wave environments of the channels available to the transmitter 2 and the receiver 3 on a basis of the radio waves received by the antenna 21. For example, the first measurement unit 22 measures a time ratio (the radio wave utilization rate) between a period in which a received power equal to or more than a threshold is detected in a measurement period and the measurement period as the radio wave environment. Accordingly, the measurement result of the radio wave environment is a result obtained by dividing the period in which the received power equal to or more than the threshold is detected in the measurement period by the measurement period. The first measurement unit 22 outputs the measurement results of the radio wave environments to the transmission control unit 23.

Figure 3:
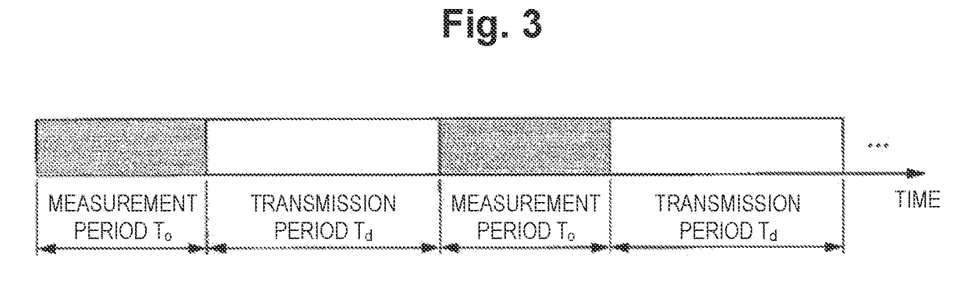
FIG. 3 is a diagram illustrating an example of a measurement period and a transmission period.

FIG. 3 is a diagram illustrating an example of the measurement period and a transmission period. In FIG. 3, the horizontal axis represents time. The measurement period $T_o$ is the measurement period of the radio wave environment. The transmission period $T_d$ is a period in which the transmitter 2 transmits the distributed coded frame. The transmitter 2 and the receiver 3 alternately repeat the measurement period and the transmission period over time.

Figure 4:
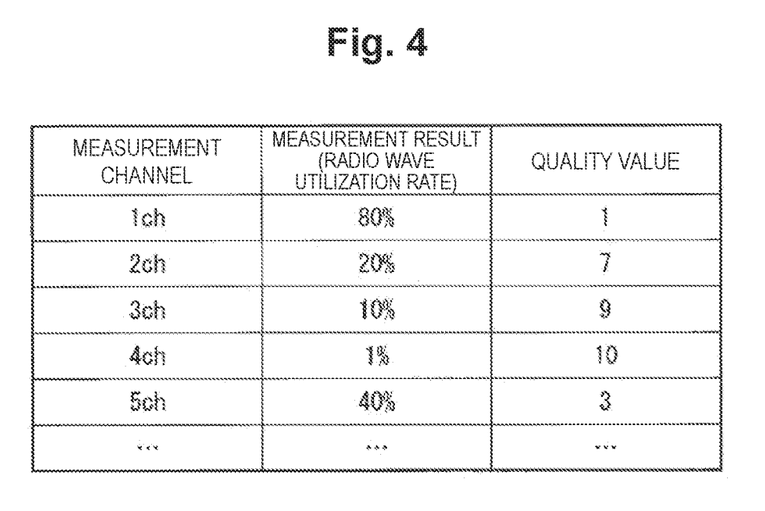
FIG. 4 is a diagram illustrating an example of a measurement result table.

FIG. 4 is a diagram illustrating an example of a measurement result table. The measurement result table indicates items of a measurement channel, the measurement result of the radio wave environment (the radio wave utilization rate), and the quality value of wireless communication. The measurement channel represents a channel in which the radio wave environment is measured. When a period in which the received power is equal to or more than the threshold in the measurement period is long (the radio wave utilization rate is high), a period in which the received power is equal to or more than the threshold in the transmission period is similarly long. The period in which the received power is equal to or more than the threshold in the transmission period is a period that is unable to be used for transmitting the distributed coded frame. Thus, the quality value of wireless communication is low in the measurement channel having a long period in which the received power is equal to or more than the threshold in the measurement period. In FIG. 4, the measurement channel "1ch", the measurement result of the radio wave environment "80%", and the quality value "1" are associated with each other as an example.

Figure 5:
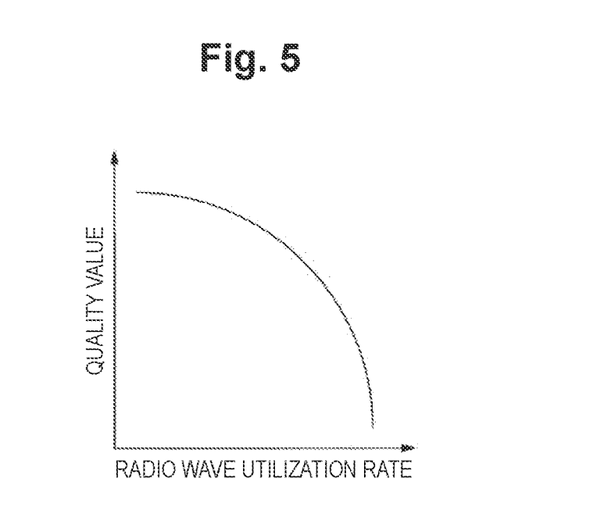
FIG. 5 is a diagram illustrating an example of a relationship between radio wave utilization rate and quality value.

FIG. 5 is a diagram illustrating an example of a relationship between the radio wave utilization rate and the quality value. The transmission control unit 23 obtains a template of a data table representing the relationship between the radio wave utilization rate and the quality value in advance. The transmission control unit 23 determines the quality value of the wireless communication for each of the measurement channels on a basis of the measurement results of the radio wave environments (the radio wave utilization rates). The transmission control unit 23 stores the quality values of the wireless communication in the measurement result table of the transmitter 2.

The transmission control unit 23 selects a plurality of channels (wireless resources) used for transmitting the respective distributed coded frames. For example, the transmission control unit 23 selects a plurality of channels on a basis of the quality values of the wireless communication and a predetermined condition. The transmission control unit 23 selects a plurality of the transmission units 25 on a basis of the selected channels (the wireless resources). The transmission control unit 23 notifies the result of the selection of the transmission units 25 (information representing the wireless resources) to the selected transmission units 25. This allows the selected transmission units 25 to obtain the distributed coded information from the encoder unit 24.

The transmission control unit 23 generates an encoding matrix used for the distributed coding of the original information for each of the measurement periods. A method by which the transmission control unit 23 generates the encoding matrix is not limited to a particular method. Columns in the encoding matrix correspond to the respective channels. Each of the columns contains 1 as many as the quality values. Each of rows in the encoding matrix contains only one 1.

The transmission control unit 23, for example, generates an encoding matrix A that combines the measurement channels and the quality values in the measurement result table illustrated in FIG. 4 as in (1ch-1, 2ch-7, 3ch-9). A relationship between an output bit sequence for the channels, an input bit sequence for the channels, and the encoding matrix A is expressed in Formula (1).

[Formula 1]

$$\begin{pmatrix} c_1 \\ c_2 \\ c_3 \end{pmatrix} = (s_1 \ldots s_{17}) \begin{pmatrix} 1 & 0 & 0 \\ 0 & 1 & 0 \\ 0 & 1 & 0 \\ 0 & 1 & 0 \\ 0 & 1 & 0 \\ 0 & 1 & 0 \\ 0 & 1 & 0 \\ 0 & 1 & 0 \\ 0 & 0 & 1 \\ 0 & 0 & 1 \\ 0 & 0 & 1 \\ 0 & 0 & 1 \\ 0 & 0 & 1 \\ 0 & 0 & 1 \\ 0 & 0 & 1 \\ 0 & 0 & 1 \\ 0 & 0 & 1 \end{pmatrix} \quad (1)$$

Here, $(c_1, c_2, c_3)$ on a left-hand side represents the output bit sequence for the channels (1ch, 2ch, 3ch). $(s_1, \ldots, s_{17})$ on a right-hand side represents the input bit sequence for the channels. The rightmost matrix on the right-hand side represents the encoding matrix A.

For example, the transmission control unit 23 generates an encoding matrix B that combines the measurement channels and the quality values in the measurement result table illustrated in FIG. 4 as in (1ch-1, 3ch-9, 5ch-3). A relationship between the output bit sequence for the channels, the input bit sequence for the channels, and the encoding matrix B is expressed in Formula (2).

[Formula 2]

$$\begin{pmatrix} c_1 \\ c_3 \\ c_5 \end{pmatrix} = (s_1 \ldots s_{13}) \begin{pmatrix} 1 & 0 & 0 \\ 0 & 1 & 0 \\ 0 & 1 & 0 \\ 0 & 1 & 0 \\ 0 & 1 & 0 \\ 0 & 1 & 0 \\ 0 & 1 & 0 \\ 0 & 1 & 0 \\ 0 & 1 & 0 \\ 0 & 1 & 0 \\ 0 & 0 & 1 \\ 0 & 0 & 1 \\ 0 & 0 & 1 \end{pmatrix} \quad (2)$$

Here, $(c_1, c_3, c_5)$ on a left-hand side represents the output bit sequence for the channels (1ch, 3ch, 5ch). $(s_1, \ldots, s_{13})$ on the right-hand side represents the input bit sequence for the channels. The rightmost matrix on the right-hand side represents the encoding matrix B.

The transmission control unit 23 selects the encoding matrix used for the distributed coding of the original information for each of the measurement periods on a basis of the measurement results of the radio wave environments. For example, when communicating over channels 1ch, 2ch, and 3ch, the transmission control unit 23 selects the encoding matrix A. For example, when communicating over channels 1ch, 3ch, and 5ch, the transmission control unit 23 selects the encoding matrix B. The transmission control unit 23 transmits information representing the selected encoding matrix to the encoder unit 24.

The encoder unit 24 obtains a bit sequence representing the original information. The encoder unit 24 performs the distributed coding of the original information (the input bit sequence) by the secret sharing processing using the encoding matrix instructed by the transmission control unit 23.

The encoder unit 24 calculates, as illustrated in Formula (1), a product of a result $(s_1, \ldots, s_{17})$, which is obtained by dividing the input bit sequence into the same number of elements as the number of rows (17 rows) of the encoding matrix A, and the selected encoding matrix A. The encoder unit 24 may calculate, as illustrated in Formula (2), a product of a result $(s_1, \ldots, s_{13})$, which is obtained by dividing the input bit sequence into the same number of elements as the number of rows (13 rows) of the encoding matrix B, and the selected encoding matrix B. The encoder unit 24 generates a bit sequence to output to the selected transmission unit 25 for each of the transmission units 25.

The encoder unit 24 outputs the information A that is based on the distributed coded original information to the transmission unit 25-1. The encoder unit 24 outputs the information B that is based on the distributed coded original information to the transmission unit 25-2. The encoder unit 24 outputs the information C that is based on the distributed coded original information to the transmission unit 25-N.

The transmission units 25 are selected by the transmission control unit 23. Each of the transmission units 25 obtains the information representing the channel (the wireless resource) used for the wireless communication from the transmission control unit 23. The selected transmission units 25 transmit the wireless frames that contain the information representing the channels used for the wireless communication to the receiver 3. The selected transmission units 25 each perform transmission processing of the distributed coded frame.

Transmission unit 25-*n* (n is any one of 1 to N) includes the antenna 20-*n*, the modulation section 250-*n*, and the wireless transmission section 251-*n*. The modulation section 250-1 modulates the information A that is based on the distributed coded original information. The modulation section 250-1 up-converts a frequency of the modulated original-information-based information A. The wireless transmission section 251-1 allocates the original-information-based information A up-converted by the modulation section 250, to the channel (the wireless resource) selected by the transmission control unit 23. The wireless transmission section 251-1 transmits the distributed coded frame containing the information A from the antenna 20-1.

The transmission unit 25-2 operates in the same manner as the transmission unit 25-1 with respect to the information B that is based on the distributed coded original information. The transmission unit 25-N operates in the same manner as the transmission unit 25-1 with respect to the information C that is based on the distributed coded original information.

Note that each of the transmission units 25 may transmit the distributed coded frame in accordance with a different wireless scheme from one another. For example, the transmission unit 25-1 may transmit the distributed coded frame in accordance with IEEE 802.11ac standard. For example, the transmission unit 25-2 may transmit the distributed coded frame in accordance with long term evolution (LTE) standard.

Figure 6:
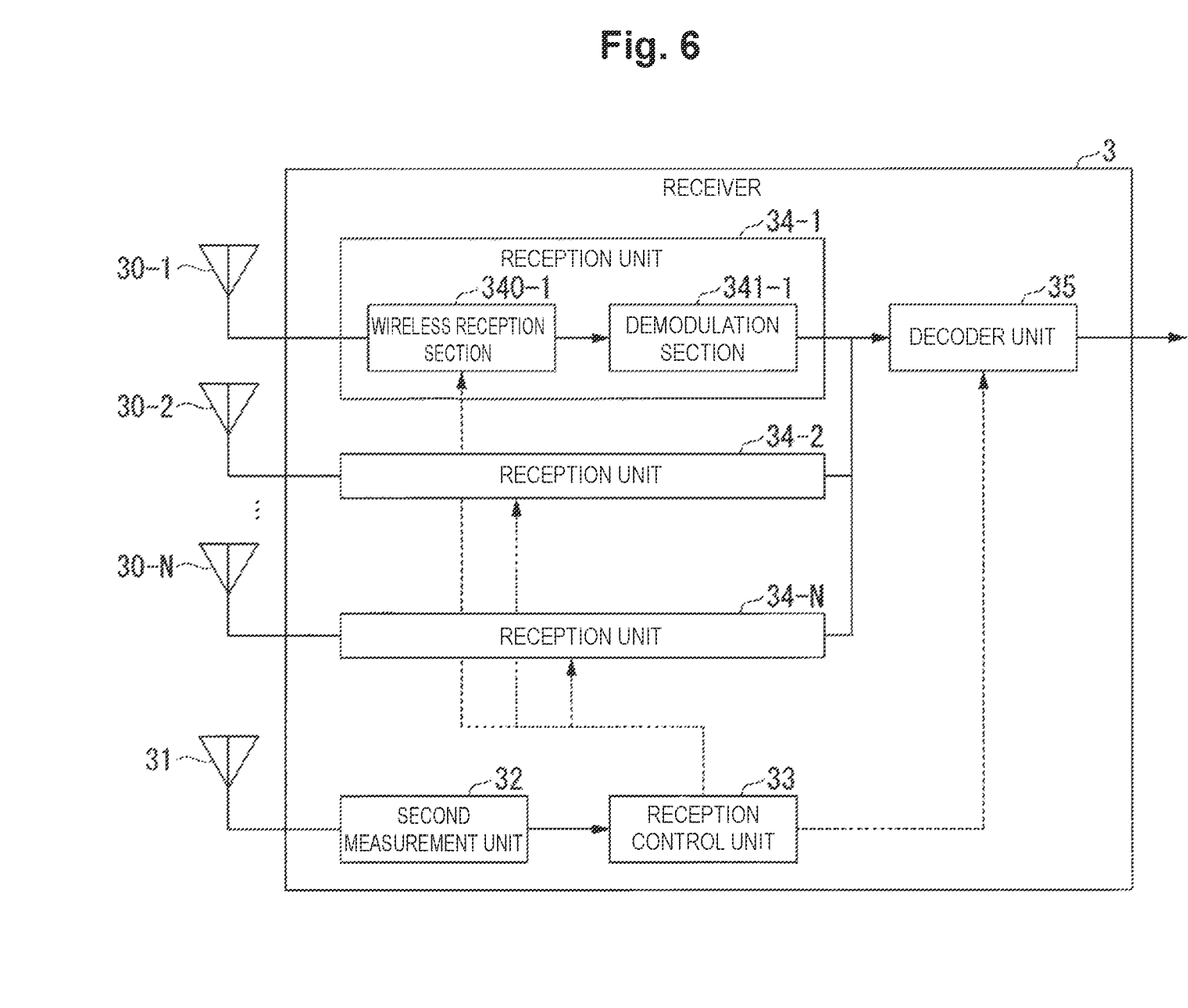
FIG. 6 is a diagram illustrating an example of a configuration of a receiver.

FIG. 6 is a diagram illustrating an example of a configuration of the receiver 3. The receiver 3 includes the antennas 30-1 to 30-N, the antenna 31, the second measurement unit 32, the reception control unit 33, the reception units 34-1 to 34-N, and the decoder unit 35. Note that the number of the reception units 34 included in the receiver 3 may be different from the number of transmission units 25 included in the transmitter 2.

Each of functional units of the second measurement unit 32, the reception control unit 33, the reception units 34, and the decoder unit 35 is implemented with hardware such as large scale integration (LSI) and application specific integrated circuit (ASIC). Each of the functional units may be implemented with a processor, such as a CPU, executing a program stored in a storage unit of the receiver 3.

The storage unit of the receiver 3 is a non-volatile storage medium (non-transitory storage medium) such as a flash memory and a hard disk drive (HDD). The storage unit of the receiver 3 may include a volatile storage medium such as a random access memory (RAM) and a register. The storage unit of the receiver 3 stores a program and a data table.

The second measurement unit 32 measures the radio wave environments between the transmitter 2 and the receiver 3 on a basis of the radio waves received by the antenna 31. That is, the second measurement unit 32 measures the radio wave environments of the channels available to the transmitter 2 and the receiver 3 on a basis of the radio waves received by the antenna 31. For example, the second measurement unit 32 measures a time period in which a received power equal to or more than a threshold in a measurement period is detected as the radio wave environment. The second measurement unit 32 outputs the measurement results of the radio wave environments (e.g., the radio wave utilization rates) to the reception control unit 33.

The second measurement unit 32 and the first measurement unit 22 of the transmitter 2 share time information representing the measurement period and transmission period in advance. That is, the time information used by the second measurement unit 32 and the time information used by the first measurement unit 22 are synchronized with each other. This allows the second measurement unit 32 to similarly measure the radio wave environment measured by the first measurement unit 22 in a period in which the first measurement unit 22 measures the radio wave environment.

The second measurement unit 32 receives the wireless frames that contain the information representing the channels used for the wireless communication from the transmitter 2. The second measurement unit 32 outputs the information representing the channels used for the wireless communication to the reception control unit 33.

The reception control unit 33 obtains a template of a data table representing the relationship between the radio wave utilization rate and the quality value in advance. The reception control unit 33 determines the quality value of the wireless communication for each of the measurement channels on a basis of the measurement results of the radio wave environments (the radio wave utilization rates). The reception control unit 33 stores the quality values of the wireless communication in the measurement result table of the receiver 3.

The reception control unit 33 estimates the encoding matrix (parameters for the encoding) that has been used for the distributed coding by the encoder unit 24 on a basis of the information representing the radio wave environments measured by the second measurement unit 32 and the information representing the channels (the wireless resources) being used by the reception unit 34. The reception control unit 33 estimates the encoding matrix that has been used for the distributed coding in the transmitter 2 for each of the measurement periods. The reception control unit 33 sets the estimation result of the encoding matrix as the decoding matrix (parameters for decoding) used for the decoding processing by the decoder unit 35.

The reception unit 34-*n* includes the antenna 30-*n*, the wireless reception section 340-*n*, and the demodulation section 341-*n*. The wireless reception section 340-1 receives the distributed coded frame containing the information A from the antenna 30-1. The wireless reception section 340-1 down-converts the frequency of the modulated original-information-based information A. The demodulation section 341-1 demodulates the information A having the down-converted frequency.

The reception unit 34-2 operates in the same manner as the reception unit 34-1 with respect to the information B that is based on the distributed coded original information. The reception unit 34-N operates in the same manner as the reception unit 34-1 with respect to the information C that is based on the distributed coded original information.

The decoder unit 35 obtains the information representing the estimated decoding matrix from the reception control unit 33. The decoder unit 35 obtains the demodulated information A from the demodulation section 341-1. The decoder unit 35 may obtain the demodulated information B from the demodulation section 341-2. The decoder unit 35 may obtain the demodulated information C from the demodulation section 341-3.

The decoder unit 35 decodes the original information by using two or more pieces of information among the information A, B, and C, and the estimated decoding matrix. For example, the decoder unit 35 calculates the bit sequence input to the transmitter 2 by performing an inverse operation of Formula (1) using the decoding matrix which is the estimation result of the encoding matrix A. The decoder unit 35 may calculate the bit sequence input to the transmitter 2 by performing an inverse operation of Formula (2) using the decoding matrix which is the estimation result of the encoding matrix B. The decoder unit 35 outputs the bit sequence calculated in this way to a predetermined external device as an output bit sequence.

Next, an example of an operation of the wireless communication system 1 will be described.

Figure 7:
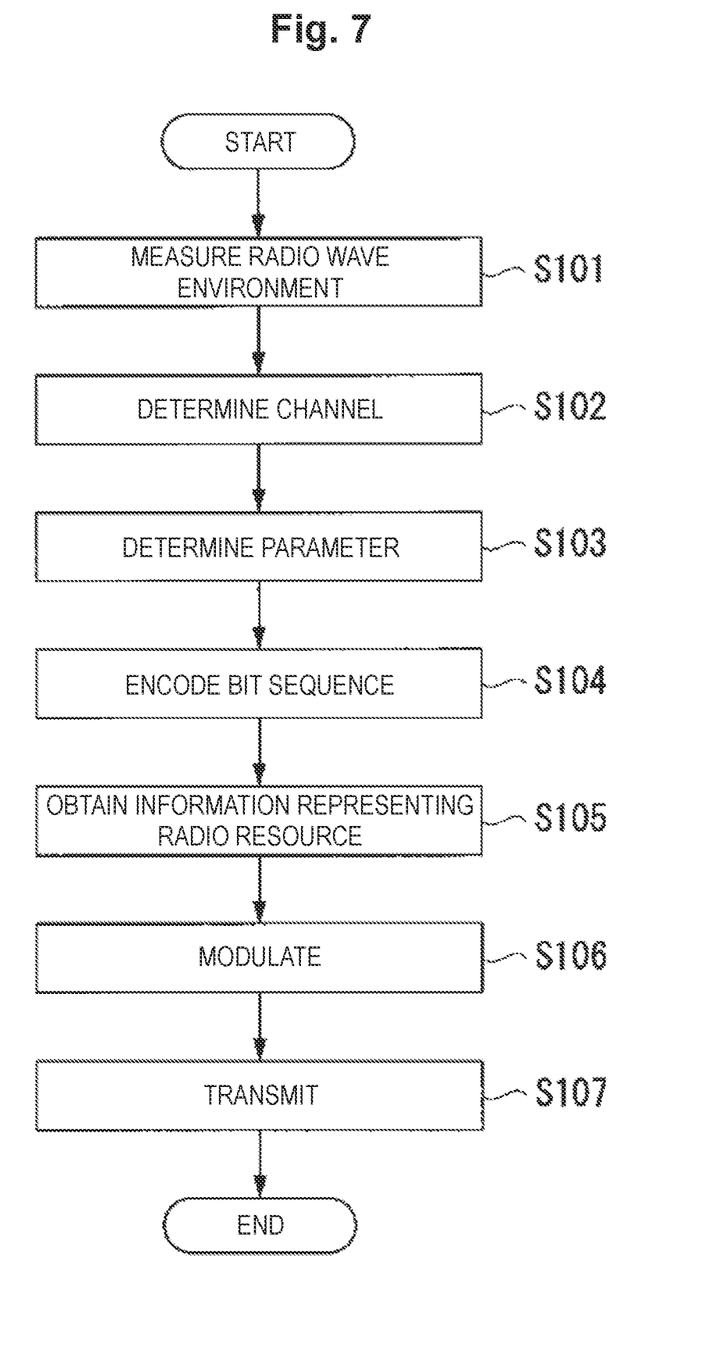
FIG. 7 is a flowchart illustrating an example of an operation of a transmitter.

FIG. 7 is a flowchart illustrating an example of an operation of the transmitter 2. The first measurement unit 22 measures the radio wave environments between the transmitter 2 and the receiver 3 (step S101). The transmission control unit 23 determines a plurality of channels (wireless resources) used for transmitting respective distributed coded frames. The selected transmission units 25 transmit wireless frames that contain information representing the channels (the wireless resources) to use to the receiver 3 (step S102).

The transmission control unit 23 selects an encoding matrix used for the distributed coding of the original information for each of the measurement periods on a basis of the measurement results of the radio wave environments. That is, the transmission control unit 23 determines parameters for each of the measurement periods on a basis of the measurement results of the radio wave environments (step S103).

The encoder unit 24 performs the distributed coding of the original information (the input bit sequence) by the secret sharing processing using the encoding matrix instructed by the transmission control unit 23 (step S104).

The transmission units 25 obtain the information representing the channels (the wireless resource) used for the wireless communication from the transmission control unit 23 (step S105). The modulation sections 250 modulate the information that is based on the distributed coded original information (step S106). The wireless transmission sections 251 transmit the distributed coded frames containing the modulated information from the antennas 20 (step S107).

Figure 8:
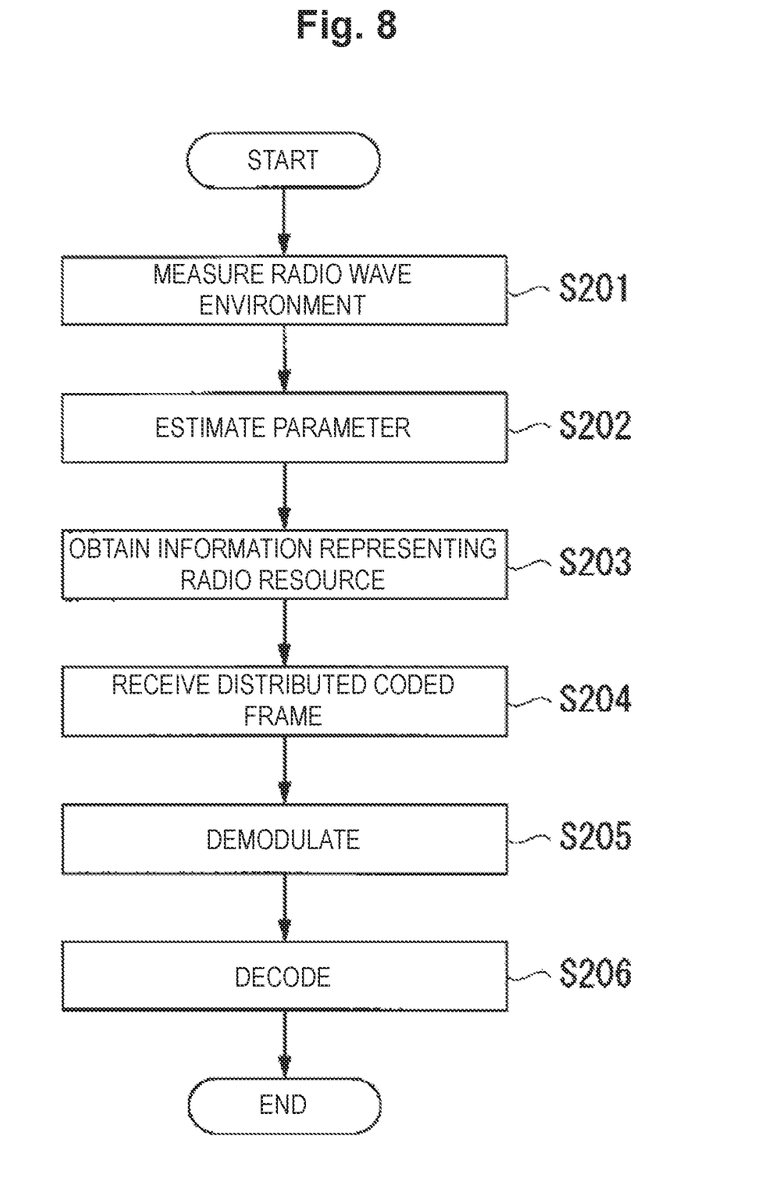
FIG. 8 is a flowchart illustrating an example of an operation of a receiver.

FIG. 8 is a flowchart illustrating an example of an operation of the receiver 3. The second measurement unit 32 measures the radio wave environments between the transmitter 2 and the receiver 3 (step S201). The reception control unit 33 estimates the encoding matrix (parameters) that has been used for the distributed coding by the encoder unit 24 on a basis of the information representing the radio wave environments measured by the second measurement unit 32 and the information representing the channels (the wireless resources) being used by the reception unit 34 (step S202).

The second measurement unit 32 receives the wireless frames that contain the information representing the channels (the wireless resources) used for the wireless communication from the transmitter 2. The reception control unit 33 obtains the information representing the channels used for the wireless communication from the second measurement unit 32 (step S203). The wireless reception sections 340 receive the distributed coded frames from the antennas 30. The wireless reception sections 340 each down-convert the frequency of the modulated original-information-based information (step S204).

The demodulation sections 341 each demodulate the information having the down-converted frequency (step S205). The decoder unit 35 decodes the original information by using two or more pieces of information among the information A, B, and C, and the estimated decoding matrix (step S206).

As described above, the wireless communication system 1 according to the embodiment includes the transmitter 2 and the receiver 3.

The transmitter includes the first measurement unit 22, the transmission control unit 23, the encoder unit 24, and the transmission units 25. The first measurement unit 22 measures the radio wave environments between the transmitter 2 and the receiver 3 for each of the wireless resources. The transmission control unit 23 determines the wireless resources and the parameters used for transmitting the bit sequence on a basis of the measurement results of the radio wave environments. The encoder unit 24 performs the distributed coding of the bit sequence on a basis of the parameters. The transmission units 25 transmit the information representing the determined wireless resources and the distributed coded bit sequences by using the determined wireless resources. The receiver 3 includes the second measurement unit 32, the reception control unit 33, the reception units 34, and the decoder unit 35. The second measurement unit 32 measures the radio wave environments for each of the wireless resources. The reception control unit 33 estimates the parameters on a basis of the measurement results of the radio wave environments. The reception units 34 receive the information representing the determined wireless resources and the distributed coded bit sequences by using the determined wireless resources. The decoder unit 35 decodes the received bit sequences on a basis of the parameters.

This allows the wireless communication system 1 according to the embodiment to perform highly secure communication even when radio wave propagation characteristics vary.

The first measurement unit 22 measures the radio wave utilization rate, which is the time ratio between the period in which the received power equal to or more than the threshold is detected and the measurement period, as the measurement result of the radio wave environment. The transmission control unit 23 determines the quality value of the wireless communication for each of the wireless resources on a basis of the radio wave utilization rate. The transmission control unit 23 determines the parameters on a basis of the quality value for each of the wireless resources.

The second measurement unit 32 measures the radio wave utilization rate, which is the time ratio between the period in which the received power equal to or more than the threshold is detected and the measurement period, as the measurement result of the radio wave environment. The reception control unit 33 determines the quality value of the wireless communication for each of the wireless resources on a basis of the radio wave utilization rate. The reception control unit 33 estimates the parameters on a basis of the quality value for each of the wireless resources.

The transmitter 2 generates the encoding matrix as the encryption key on a basis of the information representing the radio wave environments between the transmitter 2 and the receiver 3. The receiver 3 generates the decoding matrix, which is the estimation result of the encoding matrix, as the encryption key on a basis of the information representing the radio wave environments between the transmitter 2 and the receiver 3. This allows the transmitter 2 and the receiver 3 to perform highly secure communication without sharing the encryption key in advance even when the radio wave propagation characteristics vary.

The transmitter 2 and the receiver 3 distribute the original information to communicate with each other by using a plurality of wireless schemes. This allows the transmitter 2 and the receiver 3 to perform highly secure communication even when the interceptor 4 receives the distributed coded frame.

Although the embodiment of the present invention has been described above in detail with reference to the drawings, the specific configuration is not limited to the embodiment, and a design and the like that do not depart from the gist of the invention are also included.

The transmitter and the receiver in the above-mentioned embodiment may be implemented with a computer. This configuration may be implemented by storing a program for performing this function in a computer-readable storage medium and letting a computer system read the program stored in the storage medium to execute the program. Note that the "computer system" herein includes hardware such as an OS and a peripheral device. The "computer-readable storage medium" refers to a portable medium such as a flexible disk, a magneto-optical disk, a ROM, or a CD-ROM, and a storage device such as a hard disk built in the computer system. Further, the "computer-readable storage medium" may include a computer-readable storage medium dynamically storing a program for a short time, such as a communication wire in a case where a program is transmitted via a network such as the Internet or a communication line such as a telephone line, or may include a computer-readable storage medium storing a program for a predetermined time, such as a volatile memory in a computer system serving as a server or a client in the case. The program may be a program for performing a part of the functions described above, may further be a program for performing the above-described function in combination with a program already stored in the computer system, and may be a program implemented by using a programmable logic device such as a field programmable gate array (FPGA).

INDUSTRIAL APPLICABILITY

The present invention is applicable to a wireless communication system.

REFERENCE SIGNS LIST 1 wireless communication system
2 transmitter
3 receiver
4 interceptor
20 antenna
21 antenna
22 first measurement unit
23 transmission control unit
24 encoder unit
25 transmission unit
30 antenna
31 antenna
32 second measurement unit
33 reception control unit
34 reception unit
35 decoder unit
250 modulation section
251 wireless transmission section
340 wireless reception section
341 demodulation section

The invention claimed is:

1. A wireless communication system, comprising:
a transmitter; and
a receiver,
the transmitter comprising:
a processor; and
a storage medium having computer program instructions stored thereon, when executed by the processor, perform to:
measure a radio wave environment between the transmitter and the receiver for an individual wireless resource;
determine the wireless resource and a parameter used for transmitting a bit sequence on a basis of a measurement result of the radio wave environment;
perform distributed coding of the bit sequence on a basis of the parameter; and
transmit information representing the determined wireless resource and the distributed coded bit sequence, by using the determined wireless resource,
the receiver comprising:
a processor; and
a storage medium having computer program instructions stored thereon, when executed by the processor, perform to:
measure the radio wave environment for the individual wireless resource;
estimate the parameter on a basis of the measurement result of the radio wave environment;
receive the information representing the determined wireless resource and the distributed coded bit sequence, by using the determined wireless resource; and
decode the received bit sequence on a basis of the parameter;
wherein the parameter is determined by measure a radio wave utilization rate that is a time ratio between a period in which a received power equal to or more than a threshold is detected and a measurement period as the measurement result of the radio wave environment, and determine a quality value of wireless communication for the individual wireless resource on a basis of the radio wave utilization rate and determine the parameter on a basis of the quality value for the individual wireless resource.

2. A transmitter, comprising:
a processor; and
a storage medium having computer program instructions stored thereon, when executed by the processor, perform to:
measure a radio wave environment between the transmitter and a receiver for an individual wireless resource;
determine the wireless resource and a parameter used for transmitting a bit sequence on a basis of a measurement result of the radio wave environment;
perform distributed coding of the bit sequence on a basis of the parameter; and
transmit information representing the determined wireless resource and the distributed coded bit sequence, by using the determined wireless resource;
wherein the parameter is determined by measure a radio wave utilization rate that is a time ratio between a period in which a received power equal to or more than a threshold is detected and a measurement period as the measurement result of the radio wave environment, and determine a quality value of wireless communication for the individual wireless resource on a basis of the radio wave utilization rate and determine the parameter on a basis of the quality value for the individual wireless resource.

3. A receiver, comprising:

a processor; and a storage medium having computer program instructions stored thereon, when executed by the processor, perform to:

measure a radio wave environment between a transmitter and the receiver for an individual wireless resource;

estimate a parameter on a basis of a measurement result of the radio wave environment;

receive information representing the determined wireless resource and a distributed coded bit sequence, by using the determined wireless resource; and decode the received bit sequence on a basis of the parameter;

wherein the parameter is estimated by measure a radio wave utilization rate that is a time ratio between a period in which a received power equal to or more than a threshold is detected and a measurement period as the measurement result of the radio wave environment, and determine a quality value of wireless communication for the individual wireless resource on a basis of the radio wave utilization rate and estimate the parameter on a basis of the quality value for the individual wireless resource.

* * * * *